(12) United States Patent
Schlote

(10) Patent No.: US 9,062,597 B2
(45) Date of Patent: Jun. 23, 2015

(54) CENTRIFUGAL PARTICLE SEPARATOR AND METHOD OF OPERATING THE SAME

(75) Inventor: Andrew Schlote, Fenton, MO (US)

(73) Assignee: InnerPoint Energy Corporation, Kirkwood, MO (US)

( * ) Notice: Subject to any disclaimer, the term of this patent is extended or adjusted under 35 U.S.C. 154(b) by 250 days.

(21) Appl. No.: 13/468,743

(22) Filed: May 10, 2012

(65) Prior Publication Data

US 2013/0125848 A1 May 23, 2013

Related U.S. Application Data

(60) Provisional application No. 61/484,480, filed on May 10, 2011.

(51) Int. Cl.
*F02B 45/00* (2006.01)
*B01D 45/14* (2006.01)

(52) U.S. Cl.
CPC ............ *F02B 45/00* (2013.01); *C10J 2200/00* (2013.01); *B01D 45/14* (2013.01)

(58) Field of Classification Search
CPC ...... B01D 45/14; F02B 45/00; C10J 2200/00; C10J 3/34
USPC .............. 95/270, 277; 55/400, 406, 407, 408, 55/409
See application file for complete search history.

(56) References Cited

U.S. PATENT DOCUMENTS

| 3,538,657 | A |   | 11/1970 | Macrow |
|---|---|---|---|---|
| 4,783,259 | A | * | 11/1988 | Wade ............................ 210/238 |
| 4,902,196 | A | * | 2/1990 | Byrd ............................... 415/90 |
| 5,607,487 | A |   | 3/1997 | Taylor |
| 5,922,092 | A | * | 7/1999 | Taylor ............................ 55/295 |
| 8,562,701 | B2 | * | 10/2013 | Heidenreich et al. ........ 48/197 R |
| 2002/0096050 | A1 |   | 7/2002 | Miles |
| 2002/0178919 | A1 |   | 12/2002 | Miles |
| 2007/0094929 | A1 |   | 5/2007 | Kang et al. |
| 2010/0043364 | A1 |   | 2/2010 | Curien |
| 2010/0223848 | A1 |   | 9/2010 | Heidenreich et al. |

* cited by examiner

*Primary Examiner* — Amber Orlando
*Assistant Examiner* — Britanny Precht
(74) *Attorney, Agent, or Firm* — Thompson Coburn LLP

(57) ABSTRACT

A centrifugal separator comprises a filtered-gas passageway, a spinner, and a drive mechanism. The filtered-gas passageway has an inlet. The spinner is configured and adapted to rotate about a spinner axis relative to the filtered-gas passageway, and has an inner cavity, a gas permeable outer wall, and a plurality of protrusions that extend radially outward from the gas permeable outer wall relative to the spinner axis. The inner cavity of the spinner is operatively connected to the inlet of the filtered-gas passageway. The drive mechanism is adapted to rotate the spinner about the spinner axis at a rate such that the protrusions prevent particulates from passing through the gas permeable outer wall and into the inner cavity of the spinner and such that gaseous matter is able to pass through the gas permeable outer wall, into the inner cavity, and thereafter into the filtered-gas passageway via the inlet.

14 Claims, 5 Drawing Sheets

CENTRIFUGAL PARTICLE SEPARATOR AND METHOD OF OPERATING THE SAME

CROSS-REFERENCE TO RELATED APPLICATIONS

This application is a non-provisional patent application of U.S. Ser. No. 61/484,480, filed on May 10, 2011.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains to a centrifugal separator for preventing particulates suspended in gaseous matter from entering a passageway. More particularly, the present invention pertains to a centrifugal separator that comprises a spinner that revolves about an axis adjacent to an inlet into the passageway. The revolution of the spinner prevents particulates from entering the passageway and thereby allows only gaseous matter to enter the passageway. The centrifugal separator is suited for use in connection with gasifiers, but also can be used in connection with many other devices.

2. General Background

During the gasification process of some fuels, such as wood, grass, and other biofuels, particulates of ash, tar, unburned solid fuel, and other liquids and solids become suspended in the syngas within the gasifier. When drawing out syngas from gasifiers, such particulates are often drawn out along with the syngas. Thus, it is desirable to filter or separate such particulates from the syngas.

Unfortunately, the high temperatures within most gasifiers limit the types of particulate separation means that can be utilized in connection with gasifiers. Additionally, most if not all, means for separating particulates from gases have some negative impact on the flow of the gas being filtered. For example, most means for separating particulates from gases create a pressure drop that reduces the total pressure of the filtered gas. In some cases the pressure drop is too great to warrant the use of a particular type of particle separator. Additionally, the performance of some particle separators decreases as more and more particulates are removed from gaseous matter flowing therethrough.

SUMMARY OF THE INVENTION

A centrifugal particle separator in accordance with the present invention can be utilized in harsh environments, such as in gasifiers. Additionally, a centrifugal particle separator in accordance with the present invention produces only a relatively small total pressure drop in the gas flowing through the separator. Still further, a centrifugal particle separator in accordance with the present invention does not suffer from performance decreases as more and more particulates are removed from gaseous matter flowing therethrough.

In one aspect of the invention, a centrifugal separator for preventing particulates suspended in gaseous matter from entering a passageway comprises a filtered-gas passageway, a spinner, and a drive mechanism. The filtered-gas passageway has an inlet. The spinner is configured and adapted to rotate about a spinner axis relative to the filtered-gas passageway, and has an inner cavity, a gas permeable outer wall, and a plurality of protrusions that extend radially outward from the gas permeable outer wall relative to the spinner axis. The inner cavity of the spinner is operatively connected to the inlet of the filtered-gas passageway. The drive mechanism is configured and adapted to rotate the spinner about the spinner axis at a rate such that the protrusions prevent particulates from passing through the gas permeable outer wall and into the inner cavity of the spinner and such that gaseous matter is able to pass through the gas permeable outer wall, into the inner cavity, and thereafter into the filtered-gas passageway via the inlet.

If desired a centrifugal separator in accordance with the invention can be utilized in combination with a gasifier. Such as gasifier may comprise an internal chamber having a main combustion region that is configured and adapted to gasify fuel. In such a gasifier, the filtered-gas passageway associated with the centrifugal separator may constitute a gasified-fuel outlet that is operatively connected to the main combustion region and that is configured and adapted to discharge gasified fuel (syngas) from the gasifier. The spinner of the centrifugal separator can be positioned within the internal chamber of the gasifier such that it can be used to prevent particulates from leaving the internal chamber through the gasified-fuel outlet.

In another aspect of the invention, a method of preventing particulates from entering an inlet of a gas passageway comprising a step of rotating a spinner adjacent the inlet of the gas passageway about a spinner axis. The spinner has an inner cavity and a plurality of protrusions that encircle the inner cavity and extend radially outward relative to the spinner axis. The inner cavity is operatively connected to the inlet of the gas passageway. The rotation of the spinner causes the protrusions to force gas and particulates to rotate with the spinner between the protrusions about the spinner axis. The rotation of the gas and the particulates create centrifugal forces that prevent the particulates from passing into the inner cavity of the spinner but that are insufficient to prevent the gas from flowing into the inner cavity and thereafter into the gas passageway through the inlet of the gas passageway. If desired, the method can utilized in connection with a gasifier to prevent particulates from being discharged from the gasifier along with syngas.

Further features and advantages of the present invention, as well as the operation of the invention, are described in detail below with reference to the accompanying drawings.

Figure 1:
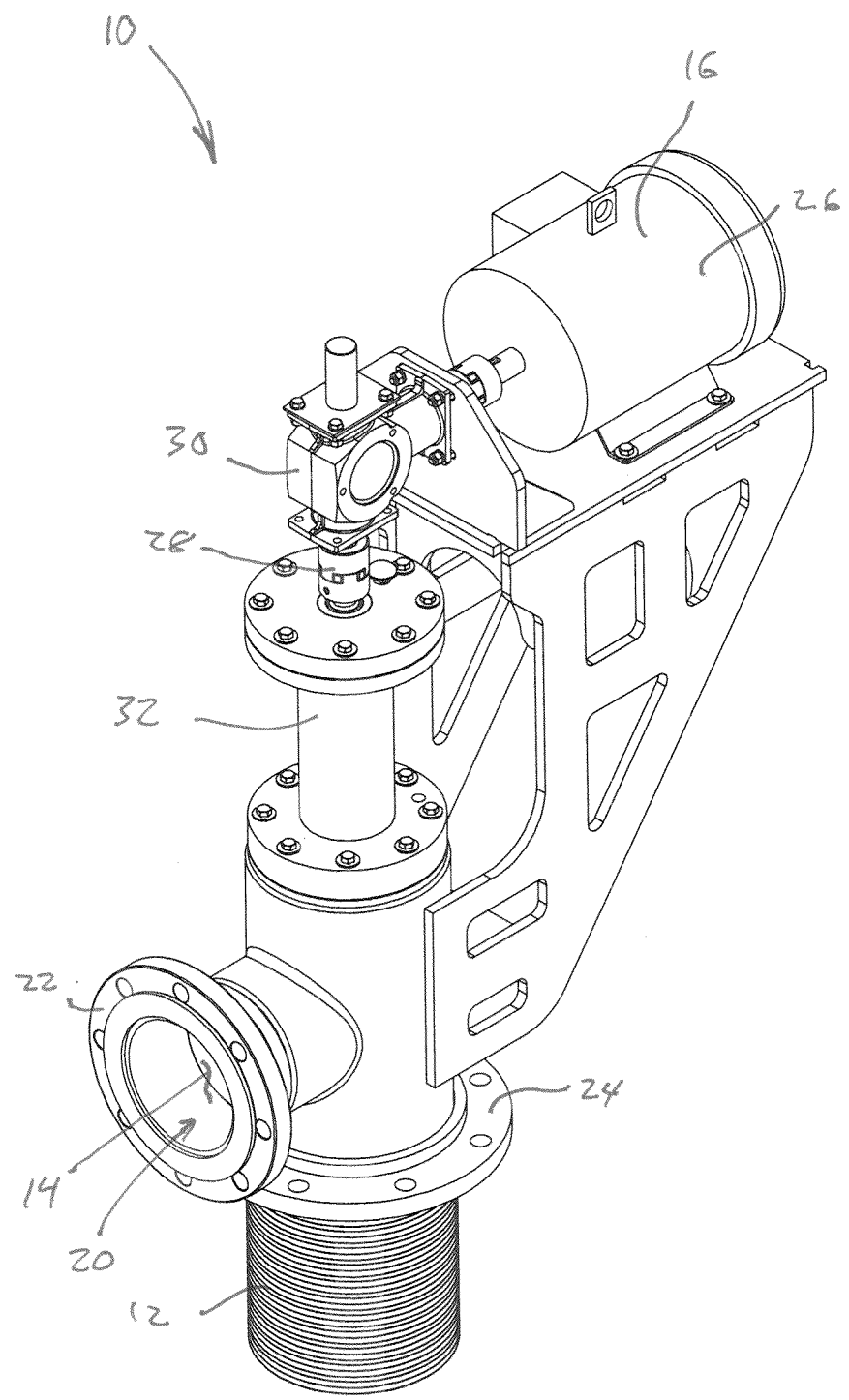
FIG. 1 depicts a perspective view of a centrifugal separator in accordance with the invention.

Reference numerals in the written specification and in the drawing figures indicate corresponding items.

DETAILED DESCRIPTION

Figure 2:
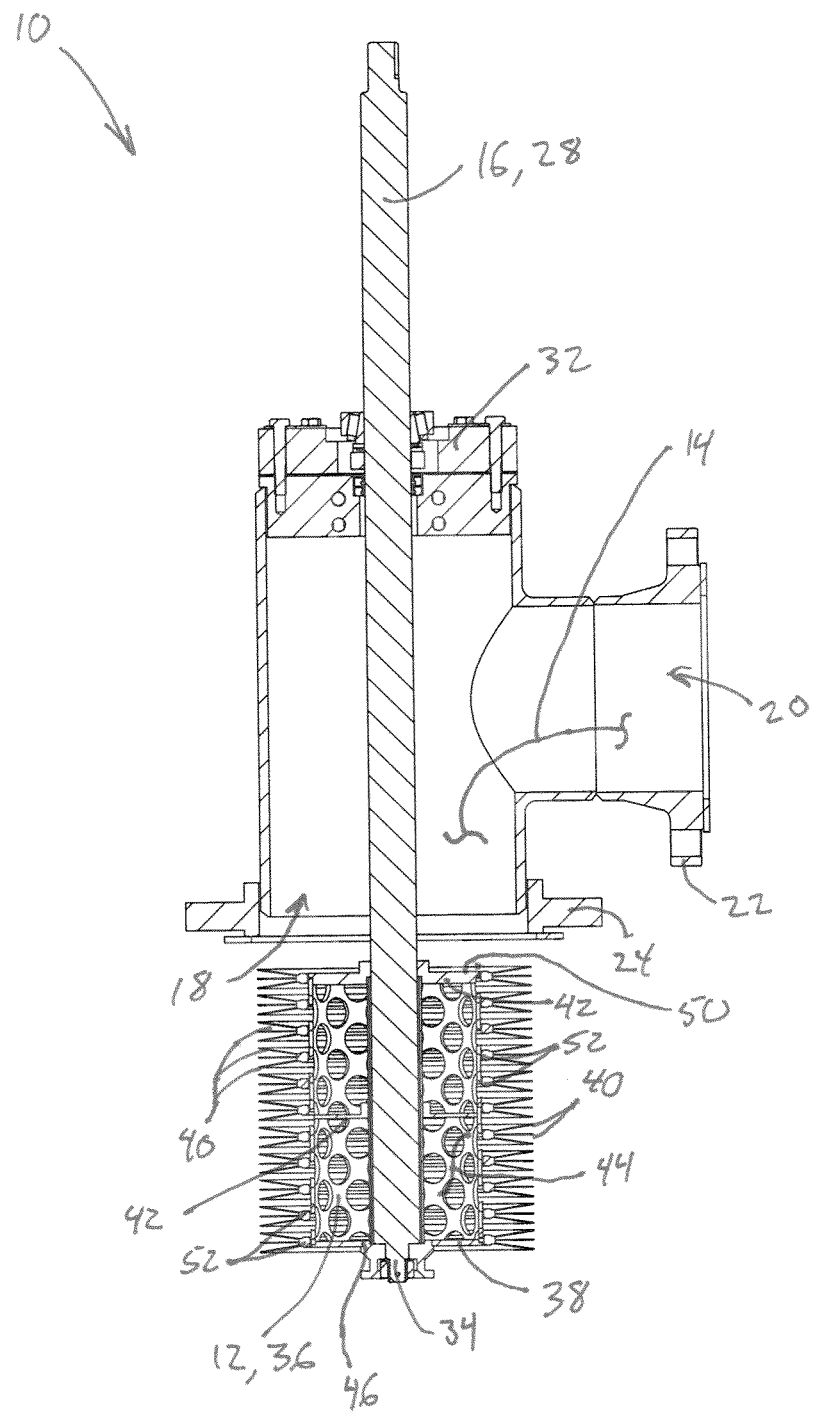
FIG. 2 depicts a cross-section of the centrifugal separator shown in FIG. 1, the cross-section being about the spinner axis.

A centrifugal separator 10 in accordance with the invention is shown by itself in FIGS. 1 and 2. The centrifugal separator 10 comprises a spinner 12, a filtered-gas passageway 14, and a drive mechanism 16.

The filtered-gas passageway 14 of the centrifugal separator 10 has an inlet 18 (see FIG. 2) and an outlet 20. The outlet 20 is preferably configured with a flange 22 that optionally allows the outlet to be removably connected to some other object such as another fluid passageway or chamber. The inlet 18 is also preferably configured with a flange 24 that optionally allows the inlet to be removably connected to some other object. The filtered-gas passageway 14 is configured to receive filtered gas through the inlet 18 and to discharge such gas through the outlet 20.

The drive mechanism 16 preferably comprises an rotational drive motor 26 and a driveshaft 28. The drive motor 26 is operatively connected to the driveshaft 28 and is configured to rotationally drive the driveshaft about the longitudinal axis of the driveshaft. The drive motor 26 is preferably an electric motor but could be any type of rotational drive motor. Also, the drive motor 26 may be operatively connected to the driveshaft 26 via a gear mechanism 30 as shown, but may also be directly connected to the driveshaft. Additionally, the drive mechanism 16 may comprise a bearing assembly 32 that is configured to support the driveshaft 28 relative to the filtered-gas passageway 14 in a manner such that the driveshaft extends through a portion of the filtered-gas passageway and centrally through the inlet 18 of the filtered-gas passageway to a terminal end 34 of the driveshaft.

Figure 3:
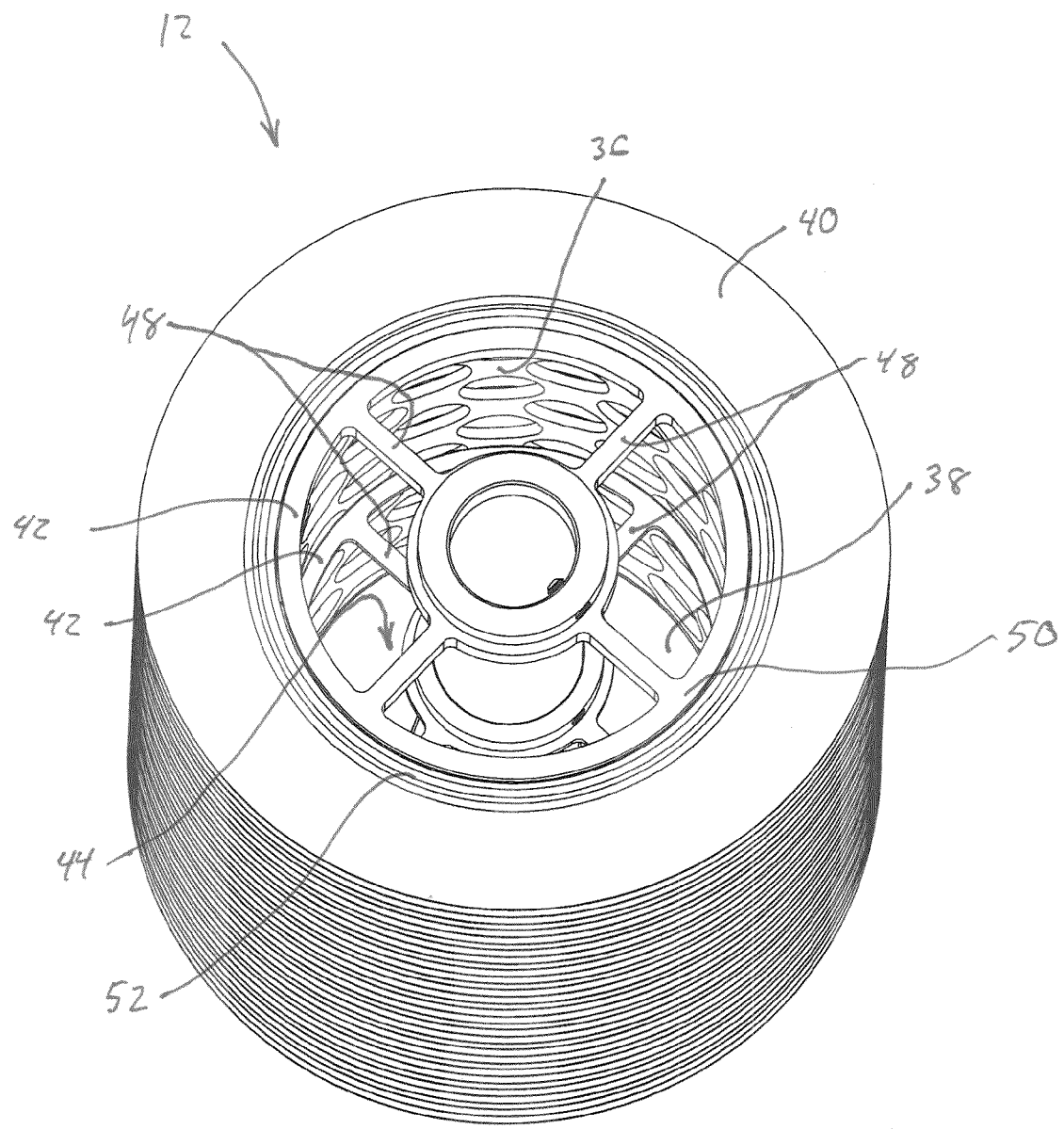
FIG. 3 depicts a perspective view of the spinner of the centrifugal separator shown in FIGS. 1 and 2.

As is most clear in FIGS. 2 and 3, the spinner 12 comprise a cylindrical gas permeable wall 36, an end cap 38, a plurality of brush bristles 40, and two spoked support wheels 42. The gas permeable wall 36 preferable is formed from metal tube that has holes cut therethrough to thereby render it gas permeable. Preferably, the gas permeable wall 36 has a diameter of approximately nine inches (matching the diameter of the inlet of the filtered-gas passageway 14) and an axial length of approximately ten inches. The gas permeable wall 36 encircles a cylindrical inner cavity 44 that is also bound by the end cap 38. The end cap is attached to the gas permeable wall 36 and closes one end of the inner cavity. The end cap 38 is preferably imperforate, except for a centrally positioned driveshaft receiving hole 46 that is configured to be secured to the terminal end 34 of the driveshaft 28. One of the spoked support wheels 42 bounds the opposite end of the inner cavity 44 and the other of the spoked support wheels is centrally positioned within the inner cavity. The spoked support wheels 42 are configured to secure the gas permeable wall 36 to the driveshaft 28 of the drive mechanism 16 without appreciably restricting gas flow between the spokes 48 of the spoked support wheels. Thus the axial end of the inner cavity 44 of the spinner 12 that is opposite the end cap 38 is substantially an unobstructed open end 50. The brush bristles 40 extend radially outward from the gas permeably wall 36 of the spinner 12. The brush bristles 40 are preferably formed of thin stainless steel wires that extend approximately one and half inches and are secured to one or more brush bands 52. In some cases, one brush band 52 can be spiraled around the gas permeable wall 36 of the spinner and welded thereto such that the brush bristles 40 surround substantially all of the gas permeable wall. Alternatively, a plurality of brush bands 52 can be attached to the gas permeable wall 36 in a manner such that the brush bristles 40 surround substantially all of the gas permeable wall.

In use, the spinner 12 of the centrifugal separator 10 is rotationally driven by the driveshaft 28 of the drive mechanism 16 with the open end 50 of the spinner facing the inlet 18 of the filtered-gas passageway 14. Preferably, the spinner 12 is rotationally driven at a rate of 1,000-3,000 revolutions per minute. When spinning, the rotation of the brush bristles 40 about the axis of the spinner 12 flings particles, including droplets of liquids, radially outward, thereby preventing such particles from passing through the gas permeable wall 36 of the spinner 12 and into the inner cavity 44 of the spinner. However, the rotation of the brush bristles 40 about the axis of the spinner 12 is not sufficient to prevent gaseous matter from passing through the gas permeable wall 36 of the spinner 12 and into the inner cavity 44 of the spinner. Thus, assuming that the pressure at the outlet 20 of the filtered-gas passageway 14 is less than the pressure surrounding the spinner 12, gaseous matter surrounding the spinner 12 will be drawn through the gas permeable wall 36 of the spinner, into the inner cavity 44 of the spinner, and then into the filtered-gas passageway 14 via the passageway's inlet 18.

Figure 4:
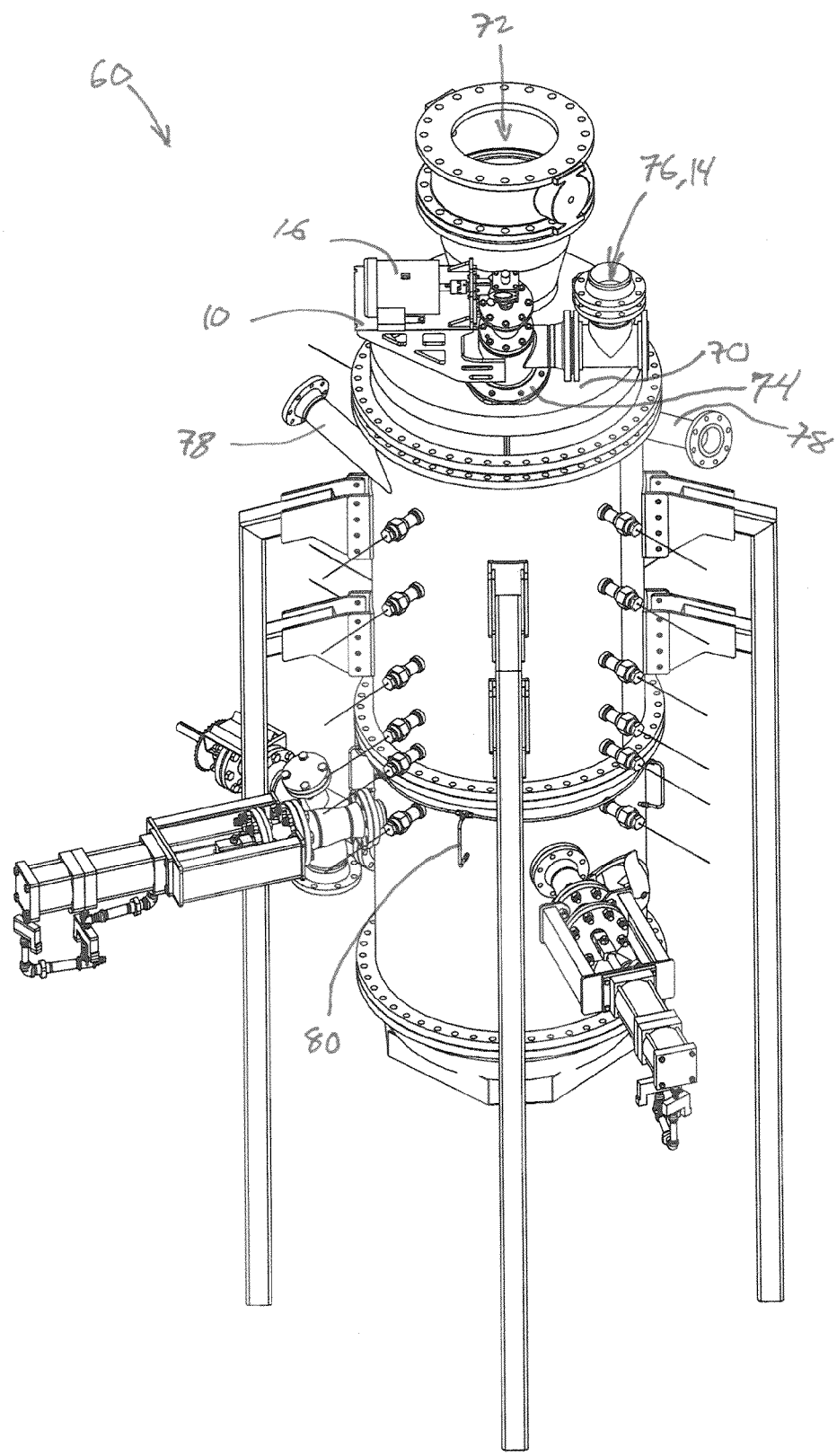
FIG. 4 depicts a perspective view of a gasifier comprising the centrifugal separator shown in FIGS. 1 and 2.
Figure 5:
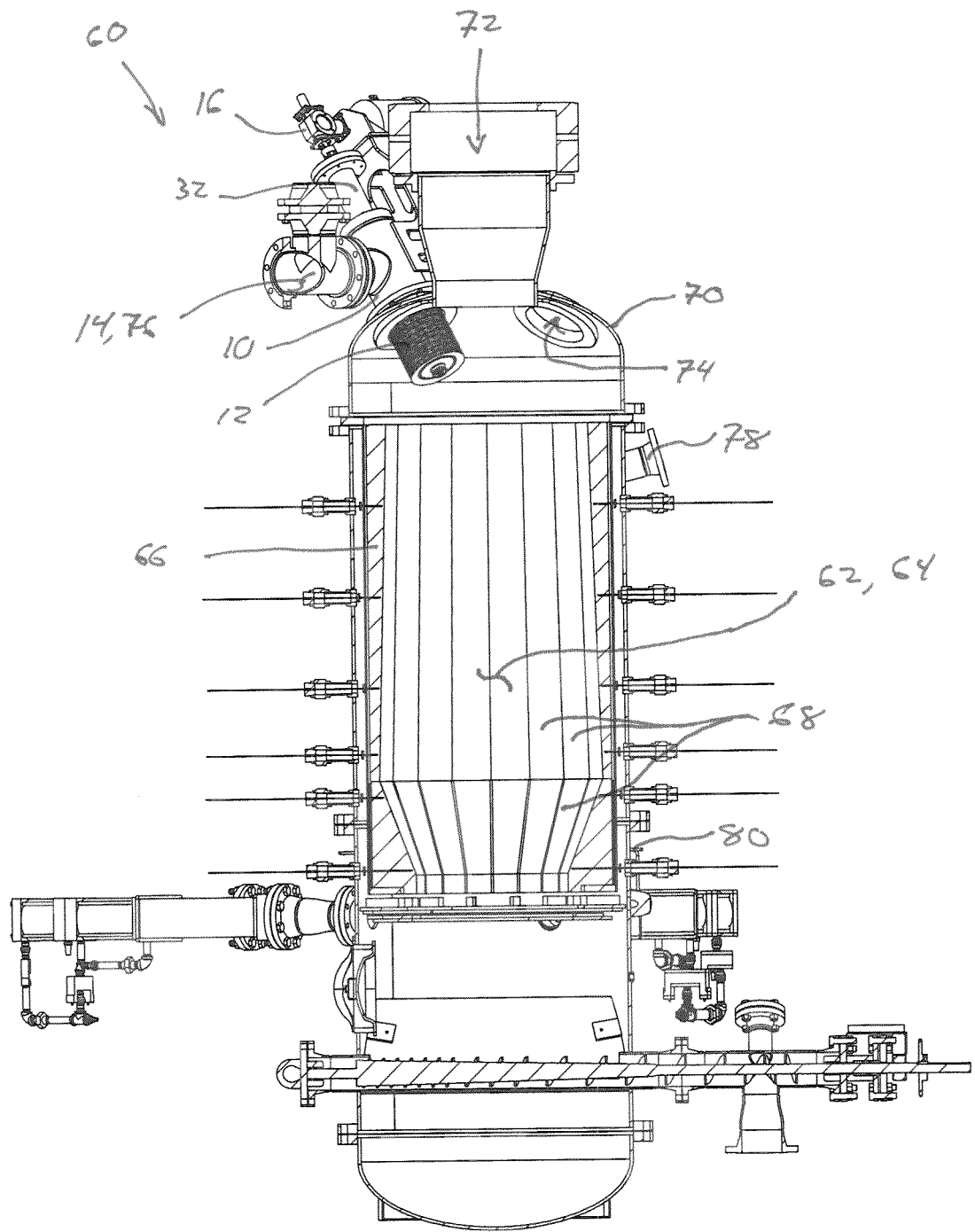
FIG. 5 depicts a cross-section of the gasifier shown in FIG. 4.

FIGS. 4 and 5 depict the centrifugal separator 10 as a component of a gasifier 60. FIG. 4 depicts a perspective view of the gasifier 60. The gasifier 60 is configured to gasify bio-fuels, petroleum based fuels, and virtual any type of fuel that can be gasified. The gasifier 60 comprises an internal chamber 62 that has a main combustion region 64. The main combustion region 64 is encircled by a ceramic wall 66 that is formed out of a plurality of ceramic blocks 68. The top of the main combustion region 64 is bounded by a dome-shaped top cover 70. The top cover 70 comprises a centrally positioned fuel inlet port 72 and a plurality of utility ports 74 spaced circumferentially around the fuel inlet port. A gasified-fuel outlet tube 76 is operatively connected to at least one of the utility ports 74 via the centrifugal separator 10. In this regard, the filtered-gas passageway 14 of the centrifugal separator 10 serves as the gasified-fuel outlet tube 76. The other utility ports 74 can serve as service access ports, ports for measuring equipment, additional fuel inlet ports, additional gasified-fuel outlets, and as variety of other things. In use, fuel is introduced into the main combustion region 64 of the gasifier 60 through the fuel inlet port 72 located on the top cover 70 of the gasifier. Additionally, air is introduced into the main combustion region 64 via air inlet tubes 78. Water may also be discharge into the internal chamber 62 of the gasifier 60 via a water injection system 80 to provide additional hydrogen and oxygen for the gasification process.

The gasification of the fuel creates hydrogen, carbon monoxide, carbon dioxide, liquid particles (such as tar), solid particles (including ash), and many other gases. The pressure within the internal chamber 62 of the gasifier 60 is greater than the pressure within the gasified-fuel outlet tube 76. As such, the matter within the internal chamber 62 of the gasifier 60 will attempt to escape from the internal chamber via the gasified-fuel outlet tube 76. To do so however, the matter must pass through the revolving spinner 12 of the centrifugal separator 10. Due to the density of the liquids and particles within the matter, such liquids and particles are flung radially outward from the spinner 12 by the brush bristles 40 of the spinner, and therefore are not able to pass through the gas permeable wall 36 of the spinner. As such, only gaseous matter is able to escape the internal chamber 62 of the gasifier 60 via the gasified-fuel outlet tube 76. This allows the gasifier 60 to operate at a relatively high throughput. The higher throughput has a direct benefit in increasing the superficial velocity in the gasifier 60, which decreases the amount of tar produced, increases the quality of syngas produced and increases the conversion efficiency of the gasifier. Still another benefit of using the centrifugal separator 10 in the gasifier 60 is that it allows the gasifier to operate at a very high output despite its compact volume (the output can be as much as five times the output of conventional gasifiers of equal size). It should also be appreciated that since the spinner 12 of the centrifugal separator 10 repels particulates, the spinner is self-cleaning and its performance remains generally constant. The configuration of the centrifugal separator 10 allows the drive motor 26 of the drive mechanism 16 to be positioned external to the internal chamber 62 and the gasified-fuel outlet tube 76 of the gasifier 60. As such the drive motor 26 and the bearing assembly 32 need not be exposed to the high temperatures within the internal chamber 62 and the gasified-fuel outlet tube 76 of the gasifier 60.

In view of the foregoing, it should be appreciated that the invention achieves the several advantages over the prior art. For example, it should be appreciated that the present invention provides an efficient way of filtering particles from gaseous matter and is well suited for use in gasifiers.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A gasifier comprising:
an internal chamber, the internal chamber comprising a main combustion region that is configured and adapted to gasify fuel;
a centrifugal separator partially positioned within the internal chamber of the gasifier, the centrifugal separator comprising a gasified-fuel outlet, a spinner, and a drive mechanism, the gasified-fuel outlet having an inlet and being operatively connected to the main combustion region in a manner such that the gasified-fuel outlet is configured and adapted to discharge gasified fuel from the gasifier through the inlet, the spinner being configured and adapted to rotate about a spinner axis relative to the gasified-fuel outlet, the spinner having an inner cavity and a gas permeable outer wall, the inner cavity being operatively connected to the inlet of the gasified-fuel outlet, the drive mechanism being configured and adapted to rotate the spinner about the spinner axis at a rate such that the spinner prevents particulates from passing through the gas permeable outer wall and into the inner cavity of the spinner and such that gaseous matter is able to pass through the gas permeable outer wall, into the inner cavity, and thereafter into the gasified-fuel outlet via the inlet, the drive mechanism comprising a driveshaft and a connected drive motor, the drive motor being positioned external to the internal chamber of the gasifier and to the gasified-fuel outlet, the driveshaft operatively connecting the spinner to the drive motor.

2. A gasifier in accordance with claim 1 wherein the gas permeable outer wall of the spinner comprises a plurality of brush bristles.

3. A gasifier in accordance with claim 2 wherein the gas permeable outer wall of the spinner is generally cylindrical and has an impermeable end cap that closes an axial end of the gas permeable outer wall.

4. A gasifier in accordance with claim 3 wherein the brush bristles extend from at least one brush band that encircles the gas permeable outer wall of the spinner.

5. A gasifier in accordance with claim 1 wherein the driveshaft of the drive mechanism is aligned with the spinner axis and extends longitudinally within and out of the gasified-fuel outlet.

6. A gasifier in accordance with claim 5 wherein the gas permeable outer wall of the spinner comprises a plurality of brush bristles.

7. A gasifier in accordance with claim 6 wherein the brush bristles extend from at least one brush band that encircles the spinner.

8. A gasifier in accordance with claim 5 wherein the wherein the gas permeable outer wall of the spinner of the centrifugal separator is generally cylindrical and has an impermeable end cap that closes an axial end of the gas permeable wall.

9. A method of preventing particulates from exiting a gasifier through an inlet of gasified-fuel outlet, the method comprising:
gasifying fuel in the gasifier in a manner creating the gas and the particulates, the gasifier comprises an internal chamber, the internal chamber comprises a main combustion region in which the gasification occurs, the gasified-fuel outlet being operatively connected to the main combustion region and external to the internal chamber;
rotating a spinner within the internal chamber of the gasifier adjacent the inlet of the gasified-fuel outlet about a spinner axis via a drive mechanism, the spinner having an inner cavity and a plurality of protrusions that encircle the inner cavity and extend radially outward relative to the spinner axis, the inner cavity being operatively connected to the inlet of the gasified-fuel outlet, the rotation of the spinner causing the protrusions to force gas and particulates to rotate with the spinner between the protrusions about the spinner axis, the rotation of the gas and the particulates creating centrifugal forces that prevent the particulates from passing into the inner cavity of the spinner but that are insufficient to prevent the gas from flowing into the inner cavity and thereafter into the gasified-fuel outlet through the inlet of the gasified-fuel outlet, the drive mechanism comprising a driveshaft and a connected drive motor, the drive motor being positioned external to the internal chamber of the gasifier and to the gasified-fuel outlet, the driveshaft operatively connecting the spinner to the drive motor.

10. A method in accordance with claim 9 wherein the protrusions are a plurality of brush bristles.

11. A method in accordance with claim 10 wherein the brush bristles extend from at least one brush band that encircles the spinner.

12. A method in accordance with claim 9 wherein the driveshaft is aligned with the spinner axis and extends longitudinally within and out of the gasified-fuel outlet.

13. A method in accordance with claim 12 wherein the protrusions of the spinner are a plurality of brush bristles.

14. A method in accordance with claim 13 wherein the brush bristles extend from at least one brush band that encircles the spinner.

* * * * *